United States Patent

[11] 3,600,584

[72] Inventor John E. Schneble
Wauwatosa, Wis.
[21] Appl. No. 828,682
[22] Filed May 28, 1969
[45] Patented Aug. 17, 1971
[73] Assignee General Electric Company

[54] X-RAY PHOTOTIMER THAT IS COMPENSATED FOR DARK CURRENT
1 Claim, 2 Drawing Figs.
[52] U.S. Cl............................................. 250/95,
250/207, 250/214
[51] Int. Cl..........................................G03b 41/16,
H01j 39/12
[50] Field of Search........................................ 250/207,
214, 95

[56] References Cited
UNITED STATES PATENTS
3,358,145 12/1967 Cashion et al................. 250/207

Primary Examiner—Archie R. Borchelt
Assistant Examiner—A. L. Birch
Attorneys—Ralph G. Hohenfeldt, Joseph B. Forman, Frank L. Neuhauser and Oscar B. Waddell ABSTRACT: X-ray film density is controlled with a phototimer that uses a detector for producing an electric current which is proportional to the instantaneous intensity of the X-rays that penetrate the film. The detector current is integrated with respect to time. The exposure is ended when the integrator output changes by a certain amount in which case the output from the integrator signals the X-ray generator to terminate. At this time, the film which is also integrating the X-radiation should be properly exposed. Leakage current varies between detectors and ordinarily causes an error in the integrated signal and, hence, in the exposure time. A circuit is provided to compensate for whatever leakage current error would exist with the particular detector that is used.

PATENTED AUG 17 1971  3,600,584

Inventor
John E. Schneble
By Ralph D. Hohenfeldt
Attorney

X-RAY PHOTOTIMER THAT IS COMPENSATED FOR DARK CURRENT

BACKGROUND OF THE INVENTION

In radiographic phototiming, X-rays from a source penetrate the subject of examination and form a photographic image on a film. A thin fluorescent screen that converts X-radiation to light can be inserted in the X-ray path either before or after the rays penetrate the film. Instantaneous screen brightness depends on X-ray intensity. A photomultiplier tube located outside the X-ray path views the screen while it is fluorescing and produces an output current that is proportional to both screen brightness and X-ray intensity. When the screen is in front of the film, the photomultiplier acts as an entrance detector and when the screen is behind the film, it acts as an exit detector.

The output current from the photomultiplier is integrated with respect to X-ray exposure time with an operational amplifier integrator. The integrated output signal is fed to a level sensor which may be a comparator that may be adjustably biased in accordance with the desired total X-ray does for the proper exposure. When the integrated signal exceeds the bias signal, the sensor produces a signal which turns off the X-ray source indirectly.

Detectors produce undesirable stray leakage currents. A principal source of these errors is the photomultiplier tube that produces a small output or leakage current (dark current) signal when voltage is applied to it even though it is in the dark. This leakage current is added to the output signal which results from the tube being exposed to light. It would not be difficult to compensate for this leakage current if it were the same with all tubes and all associated systems, but these quantities are variable. The practical approach to solving this problem has been to use photomultiplier tubes that are within a certain leakage current tolerance and to reject those that are not. The result is that a premium price must be paid for photomultiplier tubes that are good enough for X-ray phototiming. Moreover, leakage current errors are reduced, but not eliminated by using only those tubes that are within the specified tolerance.

SUMMARY OF THE INVENTION

An object of the present invention is to provide an X-ray phototimer with an automatic compensator for a variety of error causing signals associated with the use of a photodetector. Dark currents due to electric leakage and thermionic emission in a photomultiplier tube are compensated as are output currents due to ambient room light leaking into the detector and reaching the tube. Electrical leakage in the phototube socket signal conductor and connectors are also compensated. The small input bias current of the integrator amplifier is compensated too.

Additional objects are to provide an automatic compensator that uses a small number of components and that effects the correct amount of compensation regardless of the integrated X-ray dose that is chosen for a particular technical.

A preferred form of the invention supplies the photomultiplier tube current to the inverting input terminal of an operational amplifier. The amplifier acts as an augmented integrator since it has a resistor (for anticipation) in series with a capacitor in its feedback network. There is also a resistive-capacitive compensating network connected between the one input and the output of the amplifier. Before an exposure is initiated, the photodetector, such as a photomultiplier tube, is energized and only leakage currents flow. The leakage currents cause a voltage to be developed and to become stable on a capacitor in the compensating network. When the exposure is started, the feedback network, which has been short circuited until this time, is relieved of its short circuit by operation of a relay and the integrator begins to integrate the photocurrent. At the same time, the stored compensating signal voltage is applied to the integrator inverting input terminal to bring about what is effectively a subtraction of the leakage current signal from the total output signal of the photodetector.

How the foregoing and other specific objects are achieved will now be explained in the ensuring description of an embodiment of the invention taken in conjunction with the drawing.

DESCRIPTION OF A PREFERRED EMBODIMENT

Figure 1:
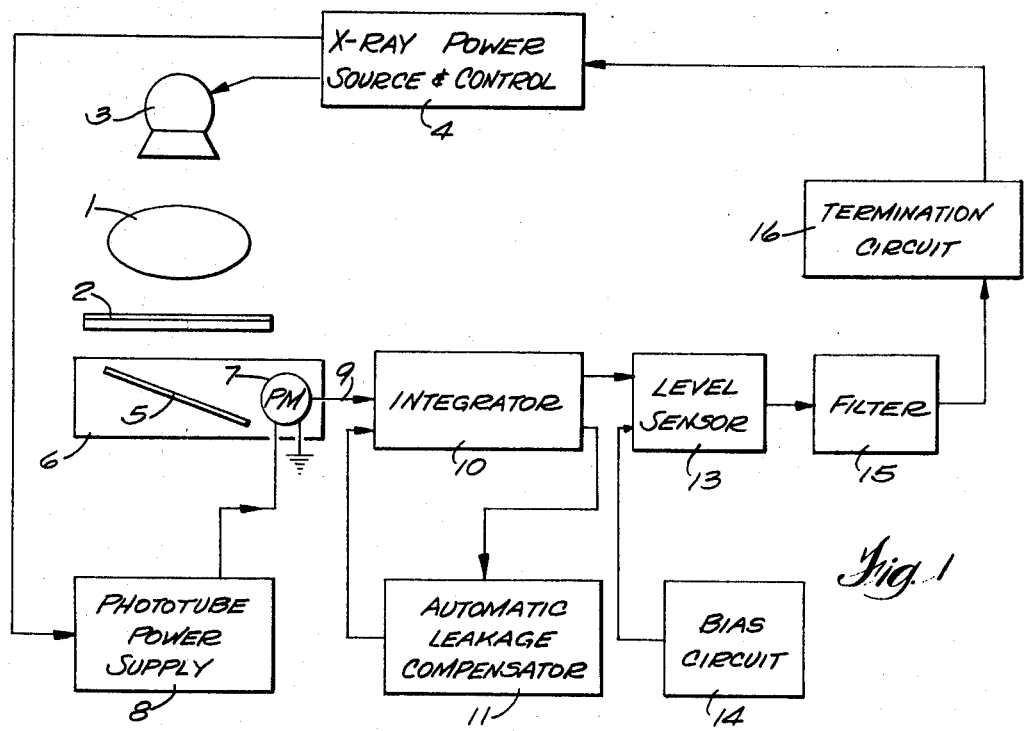
FIG. 1 is a block diagram of an X-ray phototiming system embodying the invention.

In FIG. 1, the subject to be radiographed is given the reference numeral 1. During an examination, the subject is usually on an X-ray table top, not shown, beneath which there is a film cassette 2. Above the subject is an X-ray source 3. Rays of the proper intensity and duration penetrate the subject 1 and form an image on a film in cassette 2 in a known manner.

Means for setting the desired X-ray tube factors such as voltage, tube current and a backup timer for the automatic exposure timer are symbolized by a block 4 labeled X-ray power supply and control. This block may include the usual high voltage transformer in whose secondary there is a rectifier that provides unfiltered high voltage DC across the anode and cathode of the X-ray tube 3 during an X-ray exposure. Solid state switches, not shown, may be included in the primary circuit of the transformer for controlling energization of the X-ray tube. The transformer is usually turned on with an operator-controlled switch and tuned off by a timer when an exposure is completed. Without phototiming, the operator sets the control 4 for the X-ray tube voltage, current and conduction interval that will produce a film of desired density. With phototiming the operator selects the voltage and current. The phototimer automatically controls the product of current and conduction time in terms of milliampere-seconds and it is this product that primarily determines film density or blackening for a given X-ray tube voltage and a given subject of examination. Low tube current for a long time produces the same film density as a high tube current for a proportionately shorter time. Phototiming is based on measuring total dose to the film rather than the effect of any single tube factor.

In the FIG. 1 arrangement, a portion of the radiation which passes through subject 1 and cassette 2 is intercepted by a fluorescent screen 5 which is inside a lighttight phototimer housing 6. FIG. 1 illustrates an exit detector. For an entrance detector, the positions of cassette 2 and phototimer housing 6 would be interchanged. The brightness of the screen 5 is proportional to X-ray intensity. Within housing 6 is a photodetector 7 which produces an output signal current that is proportional to the brightness of screen 5 during an exposure. The photodetector may be an RCA 931A photomultiplier tube, for example. Other photomultiplier tube types may also be used. One embodiment of the present invention permits compensating this tube for leakage current as high as 50 nanoamperes in magnitude over exposure intervals ranging up to a maximum length of 3 seconds with an effective compensation error of less than 1 nanoampere.

The photomultiplier tube, hereafter called PM7 for brevity, is energized from a very stable power supply symbolized by block 8. The power supply 8 adapted to energize PM7 before an X-ray exposure is started. PM7 produces no leakage current until energized. In a practical case, power supply 8 is turned on simultaneously with energizing the rotor, not shown, of the rotating anode X-ray tube 3 and a minimum of 0.7 seconds is allowed for the rotor to come up to full speed before suitable interlocks permit an exposure to be initiated. Before exposure, leakage current flows from PM7 after it is energized. The total output current from PM7 is delivered by way of a conductor 9 to an integrator 10 which is compensated for the leakage current resulting from PM7 with the new automatic leakage compensator 11 which will be discussed in more detail later. For the present, it is sufficient to observe that integrator 10 integrates output current from PM7 with respect to time and produces an output signal representative of the integral on its output line 12. This signal is introduced into a saturating operational amplifier or level sensor 13. The level sensor is biased at a level that corresponds with the desired amount of exposure. The variable bias circuit is shown in block form and is marked 14. When the integrator 10 output signal exceeds the bias level, the exposure should terminate as a result of the level sensor 13 switching from one saturated state to another and delivering an exposure terminating signal through a filter 15 to an X-ray termination circuit 16.

Termination circuit 16 acts on X-ray control 4 to cause the high voltage to be removed from the X-ray tube 3 which is synonymous with terminating the exposure. As is evident from the foregoing discussion, the output signal from integrator 10 should be the integral of photomultiplier PM7 output current, less leakage current, with respect to time. AFter the integrator output signal changes by a preset amount, the film in cassette 2 which is also integrating should be properly exposed.

Figure 2:
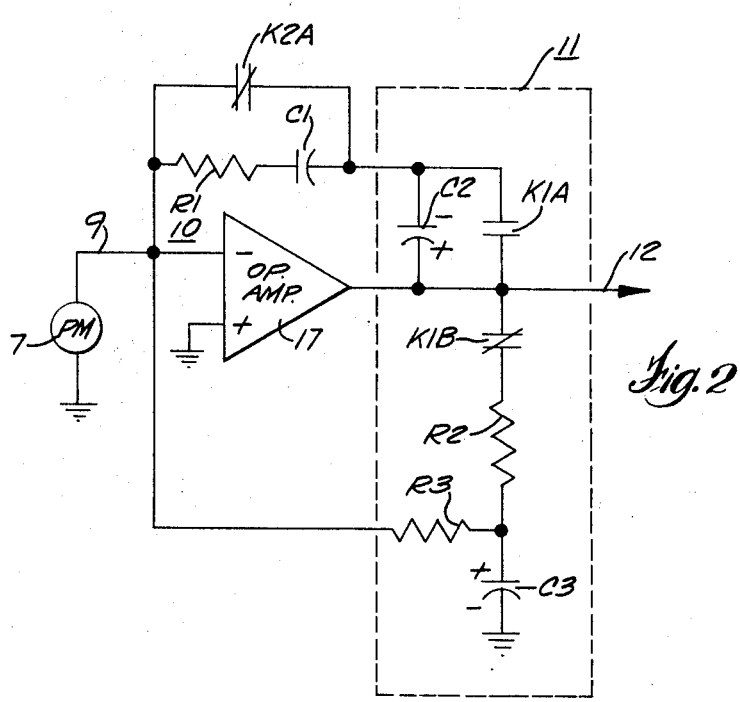
FIG. 2 is a diagram showing the integrator and automatic leakage compensator of the preceding figure in greater detail.

Attention is now invited to FIG. 2 which shows the circuitry for photomultiplier tube PM7, integrator 10 and leakage compensator 11 for the purpose of explaining how the leakage compensated integrated output signal is obtained.

FIG. 2 is a simplified schematic diagram of the circuitry showing its state during the delay period of about 0.7 seconds when the X-ray tube rotor is coming up to speed in expectation of making an exposure. High voltage is applied to PM7 at the same time that the rotor is energized, that is, at the beginning of the delay period, and leakage current begins to flow from PM7. It will be shown that the leakage current value is stored or remembered and used to compensate the signal from PM7 during an X-ray exposure.

An operational amplifier 17 has its augmented feedback circuit, comprising R1 in series with C1, short circuited by a first normally closed contact K2A when leakage current begins to flow. Assume leakage current to be negative, that is, the direction of conventional current is from the amplifier input, to the phototube anode. This circuit will compensate positive or negative leakages equally well; however, the actual leakages obtained in practice are usually negative. Capacitor C1 charges rapidly to the indicated polarity if there is negative leakage. Storage capacitor C3 in the compensation loop is initially discharged so no current flows through high resistance R3 at the start. But, C3 begins to charge positively, as indicated, through normally closed contact K1B and R2. The voltage on C3 follows the voltage on C2 but lags it because of the R2, C3 time constant. With a positive voltage across C3, part of the leakage current now flows through R3 and the current to C2 decreases. The current to C2 decreases and the current through R3 increases until at steady-state the current through R3 equals the leakage current and the current of C2 equals zero. At this time, C2 and C3 are both charged to a positive voltage equal to leakage current times the ohmic value of R3.

Steady-state is reached before the end of the delay period. At the end of the delay period, when the X-ray exposure is initiated, reed relay coils, not shown, are energized in the proper sequence and the contacts in FIG. 2 change state. First, normally closed contact K1B opens so that the voltage across C3 is no longer affected by the output of amplifier 17. Then the normally open contact K1A closes, short circuiting C2 and bring the amplifier 17 output to zero. A few milliseconds later, normally closed contact K2A opens to remove the short circuit from across series connected R1 and the integrated capacitor C1. The feedback circuit then comprises R1, C1 and closed contact K1A in series between the output terminal of operational amplifier 17 and its inverting input terminal. Thus, the integrator is ready to operate before an exposure begins.

When an X-ray exposure begins, PM7 delivers a current that is proportional to the instantaneous brightness of fluorescent screen 5 in the phototimer plus leakage current. However, compensating capacitor C3 is now charged to the leakage current value so the leakage current from PM7 will flow through R3 instead of the integrating capacitor circuit R1 and C1. Since the R3, C3 time constant is chosen large compared to the maximum exposure length of about 3 seconds, most of the leakage current will continue to flow through R3 and not through the integrating capacitor for the duration of the exposure.

A commercial embodiment of the solid-state phototimer is adapted to correct for leakage currents ranging up to a magnitude of 50 nanoamperes (na.) with a maximum error in compensation of 1.9 na. The error in correction is due to slight discharging of C2 during an exposure. For this maximum 1.9 na. error, the error increases nearly linearly from zero at the beginning of the exposure to 1.9 na. at the end of the exposure. Thus, the average or effective correction error is 0.95 na. This represents 3 percent error for a minimum PM signal current of 33 na. at 3 seconds exposure length. For shorter exposures, the error is less than 3 percent. Thus, photodetectors with large dark currents may be used rather than rejected. This circuit will correct leakages of more than 50 nanoamperes, but in this case, the effective compensation error will be greater than 0.95 nanoamperes.

An illustrative embodiment of the circuitry in FIG. 2 uses RCA 931A photomultiplier tube. The operational amplifier may be any type that has an input bias current which is only a small part of the leakage correction range. R3 is 40 megohms R2 is 5 kilohms (k.). R1 depends on the frequency of the X-ray pulses and, hence, the frequency of the output pulses from PM7. For a standard SCR X-ray contactor: at 60 Hz. 3-phase, R1 is 82 k.; at 60 Hz. 1-phase, R1 is 27 k.; at 50 Hz. 3-phase and 1-phase, R1 may be respectively, 100 k. and 33 k. C1, c2 and C3 are 0.1, 0.001 and 2.0 microfarads, respectively. Test results show that compensator response speed is adequate with these parameters as the capacitor C3 voltage is within one-half percent of the steady-state within 0.16 seconds which is well within the 0.7 seconds alloted for steady-state to be reached.

Although an illustrative embodiment has been described in some detail, it will be understood that the principles of the new automatic means for compensating an X-ray phototimer for photodetector leakage can be variously embodied. Therefore, the scope of the invention is to be determined only by construing the claims which follow.

I claim:

1. For use in a diagnostic X-ray system that includes an X-ray source adapted to project an X-ray beam through an examination subject onto an X-ray image recording means, a compensated X-ray phototimer comprising:

a. detector means adapted to produce on its output terminal an electric output signal that is representative of the instantaneous intensity of the X-ray beam which has penetrated the examination subject, said detector means also producing a leakage current in the absence and presence of X-radiation, b. amplifier means having an output terminal and an inverting input terminal, the latter of which is connected to the output terminal of the detector means, c. an integrating feedback network connected between the inverting input terminal and output terminal of the amplifier means, said network comprising first and second capacitors connected in series between said input and output terminals and a first normally closed switch contact connected in parallel with the first capacitor and a second normally open switch contact connected in parallel with the second capacitor, d. a third leakage signal storage capacitor, a resistor and a third normally closed switch all in series and connected jointly to said amplifier output terminal and said second capacitor, and e. a resistor connected between said third storage capacitor and said inverting amplifier input terminal,
f. said first and third switches being closed to charge said second capacitor and third storage capacitor to a voltage of one polarity representative of leakage current value when only leakage current is flowing from the detector means prior to initiation of X-radiation, said second switch being closed and said first and third switches being opened when X-radiation is initiated, whereby to apply the voltage that is stored on the third capacitor to the inverting amplifier input terminal simultaneously with the total signal from the detector means to thereby compensate for leakage current after X-radiation is initiated.